US011300652B1

(12) United States Patent
Wieczorek et al.

(10) Patent No.: US 11,300,652 B1
(45) Date of Patent: Apr. 12, 2022

(54) SYSTEMS AND METHODS FOR GENERATING IMAGES FROM SYNTHETIC APERTURE RADAR DATA USING NEURAL NETWORKS

(71) Applicant: Rebellion Defense, Inc., Washington, DC (US)

(72) Inventors: Aaron Wieczorek, Seattle, WA (US); Steven Rafael Turner, Arlington, VA (US)

(73) Assignee: Rebellion Defense, Inc., Washington, DC (US)

( * ) Notice: Subject to any disclaimer, the term of this patent is extended or adjusted under 35 U.S.C. 154(b) by 0 days.

(21) Appl. No.: 17/336,258

(22) Filed: Jun. 1, 2021

Related U.S. Application Data

(60) Provisional application No. 63/107,923, filed on Oct. 30, 2020.

(51) Int. Cl.
  *G01S 7/06* (2006.01)
  *G01S 13/90* (2006.01)
(52) U.S. Cl.
  CPC .......... *G01S 7/062* (2013.01); *G01S 13/9021* (2019.05)
(58) Field of Classification Search
  CPC .. G01S 13/90; G01S 13/9021; G01S 13/9094; G01S 7/417; G06T 3/4046; G06T 9/002
  See application file for complete search history.

(56) References Cited

U.S. PATENT DOCUMENTS

| | | | |
|---|---|---|---|
| 10,365,364 B1 | 7/2019 | Prados et al. | |
| 10,371,797 B1 | 8/2019 | Prados et al. | |
| 10,761,187 B2* | 9/2020 | Santra | G01S 13/42 |
| 10,775,482 B2* | 9/2020 | Santra | G01S 13/881 |
| 10,867,415 B1* | 12/2020 | Korbin | G06T 9/002 |
| 10,895,637 B1* | 1/2021 | Padmanabhan | G01S 13/9027 |
| 10,976,429 B1* | 4/2021 | Jiang | G01S 13/9029 |
| 11,037,030 B1* | 6/2021 | Kolouri | G01S 13/9027 |
| 2016/0019458 A1* | 1/2016 | Kaufhold | G01S 13/90 342/25 F |
| 2019/0004535 A1* | 1/2019 | Huang | G05D 1/0251 |
| 2019/0272620 A1* | 9/2019 | Seip | G06N 3/08 |
| 2020/0065968 A1* | 2/2020 | Sargent | G06T 7/10 |
| 2020/0256936 A1* | 8/2020 | Liu | G01R 33/288 |
| 2020/0258296 A1* | 8/2020 | Pennings | G06T 15/205 |
| 2020/0264300 A1* | 8/2020 | Rostami | G01S 13/9027 |
| 2020/0272899 A1* | 8/2020 | Dunne | G06N 3/08 |
| 2020/0342572 A1* | 10/2020 | Chen | G06N 3/08 |
| 2020/0393558 A1* | 12/2020 | Orr | G06N 20/00 |
| 2021/0003697 A1* | 1/2021 | Zhai | G06K 9/6256 |
| 2021/0003699 A1* | 1/2021 | Zhai | G06T 5/50 |
| 2021/0003700 A1* | 1/2021 | Zhai | G06N 3/0454 |
| 2021/0027113 A1* | 1/2021 | Goldstein | G06K 9/6289 |
| 2021/0063535 A1* | 3/2021 | Hakobyan | G01S 7/417 |

(Continued)

*Primary Examiner* — Peter M Bythrow
(74) *Attorney, Agent, or Firm* — Wilson Sonsini Goodrich & Rosati

(57) ABSTRACT

The present disclosure provides systems and methods for generating a red-green-blue (RGB) image from synthetic aperture radar (SAR) data. An example method comprises (a) obtaining said SAR data; (b) pre-processing said SAR data to generate pre-processed SAR data; and (c) processing said pre-processed SAR data with a generative neural network to generate said RGB image.

20 Claims, 5 Drawing Sheets

(56) References Cited

U.S. PATENT DOCUMENTS

| | | | |
|---|---|---|---|
| 2021/0063565 A1* | 3/2021 | Sharma | G01S 7/40 |
| 2021/0073646 A1* | 3/2021 | Junginger | G06N 3/0454 |
| 2021/0109209 A1* | 4/2021 | Li | G01S 13/9027 |
| 2021/0133936 A1* | 5/2021 | Chandra | G06T 5/005 |
| 2021/0149041 A1* | 5/2021 | Cho | G01S 7/04 |
| 2021/0150197 A1* | 5/2021 | Kokkinos | G06K 9/6215 |
| 2021/0166013 A1* | 6/2021 | Tensmeyer | G06K 9/00859 |
| 2021/0192762 A1* | 6/2021 | Guan | G06T 15/06 |
| 2021/0215818 A1* | 7/2021 | Kim | G06K 9/3241 |
| 2021/0223388 A1* | 7/2021 | Hakobyan | G01S 13/931 |
| 2021/0231795 A1* | 7/2021 | Kolouri | G01S 13/9052 |

* cited by examiner

SYSTEMS AND METHODS FOR GENERATING IMAGES FROM SYNTHETIC APERTURE RADAR DATA USING NEURAL NETWORKS

CROSS-REFERENCE

This application claims priority to U.S. Provisional Application No. 63/107,923 filed on Oct. 30, 2020, which is incorporated herein by reference in its entirety.

BACKGROUND

A synthetic aperture radar ("SAR") system can obtain data representing the topography of the surface of the Earth and the objects thereon. The data may comprise amplitude and phase measurements of microwave pulses that are generated by the SAR system, reflected by the surface of Earth, and return to the SAR system.

SUMMARY

The present disclosure provides systems and methods for generating red-green-blue ("RGB") images from synthetic aperture radar ("SAR") data. SAR systems do not use waves in the visible spectrum, so it may be difficult for humans to understand and interpret the data that such systems generate. Traditionally, to provide some level of visual interpretability, the large spectrum of SAR values (i.e., 2.4 billion) in SAR data are roughly mapped into buckets in the visible range. However, this crude process produces visible imagery that is typically grayscale and only vaguely resembles what an RGB image of the same area might look like. Analysts may be tasked with annotating the SAR imagery to localize and identify objects, but this process may be time-consuming and error-prone given the low-quality nature of SAR imagery when transferred to the visual space. The present disclosure provides systems and methods that use generative neural networks to generate more realistic, high-quality RGB images from SAR.

In an aspect, the present disclosure provides a method for generating an RGB image from SAR data, comprising, (a) obtaining the SAR data; (b) pre-processing the SAR data to generate pre-processed SAR data; and (c) processing the pre-processed SAR data with a generative neural network to generate the RGB image. In some embodiments, (b) comprises applying a clustering algorithm to the SAR data. In some embodiments, (b) comprises applying a dimensionality reduction algorithm to the SAR data. In some embodiments, (b) comprises normalizing the SAR data. In some embodiments, the generative neural network comprises an encoder and a decoder. In some embodiments, the encoder comprises one or more fully connected layers. In some embodiments, the encoder comprises one or more convolutional layers and one or more adaptive instance normalization (AdaIN) layers. In some embodiments, the decoder comprises one or more convolutional layers and one or more adaptive instance normalization (AdaIN) layers. In some embodiments, prior to (c), training the generative neural network with a discriminative neural network. In some embodiments, the training comprises: (1) training the discriminative neural network to classify an input image as a true RGB image or a predicted RGB image generated by the generative neural network; and (2) training the generative neural network to generate predicted RGB images that the discriminative neural network incorrectly classifies as true RGB images. In some embodiments, (2) comprises providing a plurality of SAR training examples to the generative neural network to generate a plurality of predicted RGB images, providing the plurality of predicted RGB images to the discriminative neural network, and penalizing the generative neural network if the discriminative neural network correctly classifies the predicted RGB images. In some embodiments, the method further comprises training the generative neural network at least in part on coincident pairs of SAR data and RGB images. In some embodiments, the method further comprises training the generative neural network using self-consistency loss. In some embodiments, the method further comprises postprocessing the RGB image. In some embodiments, the method further comprises displaying the RGB image in a user interface, wherein steps (a)-(c) are performed in less than 5 seconds. In some embodiments, the method further comprises providing the RGB image to an image processing pipeline for analysis. In some embodiments, the SAR data comprises a location at which the SAR data was obtained. In some embodiments, the generative neural network receives as input a representation of a desired output domain and a sampled vector from a truncated Gaussian distribution.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The term "synthetic aperture radar" ("SAR"), as used herein, generally refers to a radar system that relies on the motion of the system's antenna over a target region to provide better spatial resolution than a conventional radar system. A SAR system may have an antenna. The SAR system may be mounted on an aircraft or satellite. The distance that the SAR system travels (e.g., on the aircraft or satellite) during the round-trip time of a radar pulse defines the synthetic aperture (i.e., receiving cross-section) of the antenna. The synthetic aperture may be much larger the antenna's physical aperture. The large synthetic aperture may allow the SAR system to generate high resolution data (e.g., a high-resolution topographical map).

The present disclosure provides systems and methods for generating red-green-blue (RGB) images from SAR data. A SAR system mounted on an aircraft or satellite can obtain SAR data representing the topography of the surface of the Earth and the objects thereon. The SAR data may comprise amplitude and phase measurements of microwave pulses that are generated by the SAR system, reflected by the surface of Earth, and return to the SAR system. The large spectrum of SAR values in the data can be mapped into buckets in the visible range. However, this crude process may produce visible imagery that is grayscale and only vaguely resembles what an RGB image of the same area might look like. Analysts may be tasked with annotating the SAR imagery to localize and identify objects, but this process may be time-consuming and error-prone given the low-quality nature of SAR imagery.

Figure 1:
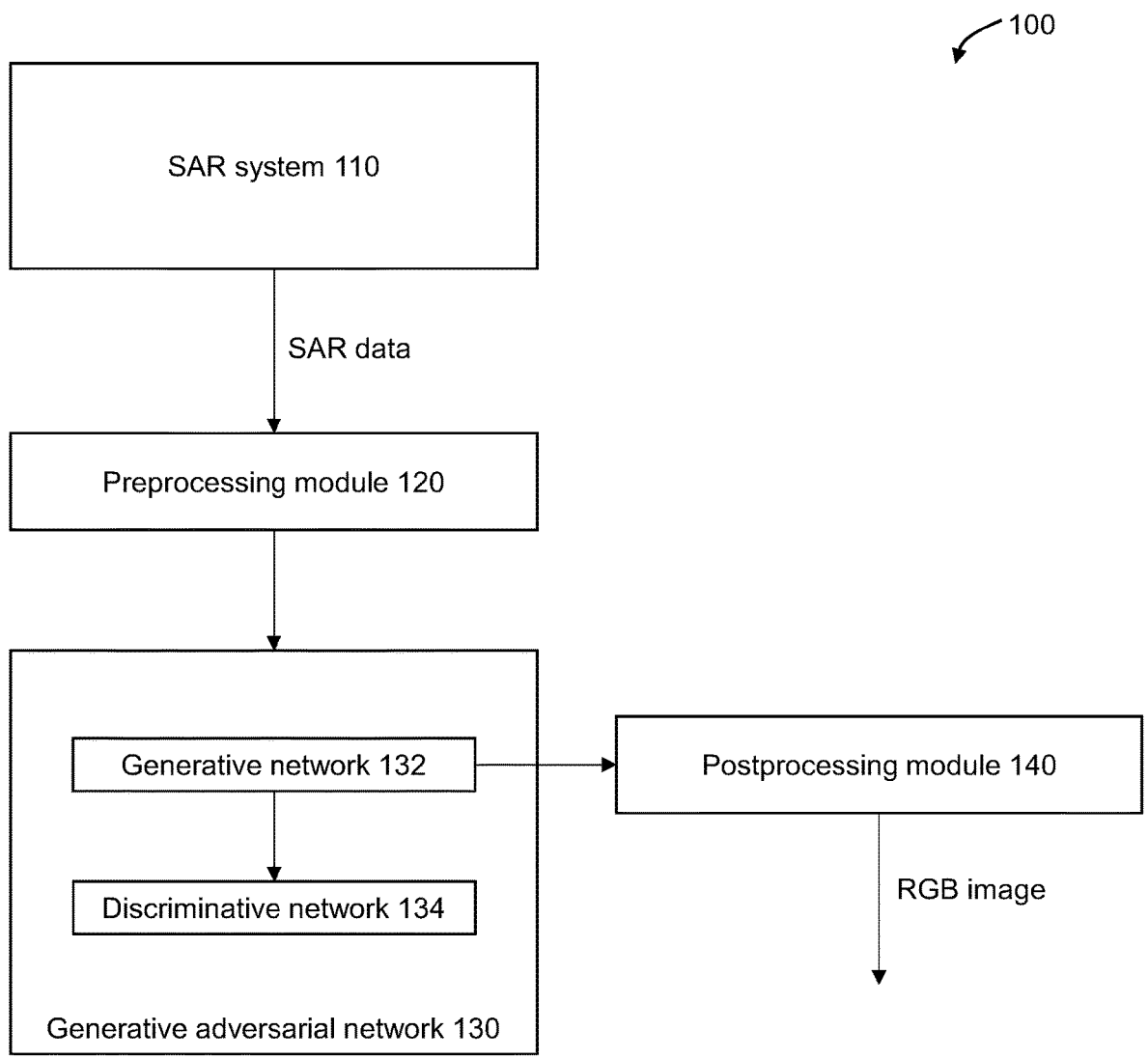
FIG. 1 schematically illustrates a system for generating red-green-blue ("RGB") images from synthetic aperture radar ("SAR") data, according to some embodiments of the present disclosure.

FIG. 1 schematically illustrates a system 100 for generating an RGB image of SAR data. The system 100 may have a SAR system 110, a preprocessing module 120, a generative adversarial network (GAN) 130, and a postprocessing module 140.

The SAR system 110 may be mounted on an aircraft or satellite. The SAR system 110 can obtain SAR data that represents the topography of a surface (e.g., the surface of the Earth) and objects on the surface. The SAR system 110 can obtain such data by transmitting successive pulses of radio waves and receiving and recording their reflections. The SAR system 110 can process the SAR data to generate a SAR image of the surface. The SAR image may be a map of radar reflectivity, including amplitude and optionally phase. The SAR image may be more difficult for a human to interpret than an RGB image. For example, although the SAR image may resemble an oblique photograph, it may not resemble a photograph taken from the location of the radar. Additionally, certain radar returns may be overlaid on each other, and objects in motion may appear to be in incorrect locations due to the Doppler effect. Therefore, it may be beneficial to convert SAR data directly into an RGB image that a human can more easily interpret.

The preprocessing module 120 can receive the SAR data from the SAR system 110 and normalize it to a range of −1 to 1 by subtracting the mean of the SAR data and dividing by the standard deviation. The preprocessing module 120 may also perform clustering and/or dimensionality reduction on the SAR data to discover distributions of textures and patterns to inform the colorization process. Clustering may involve applying a clustering algorithm to the SAR data to generate groups of similar data (e.g., patterns) within the SAR data. The clustering algorithm may be a centroid-based clustering algorithm (e.g., k-means), a hierarchical clustering algorithm, a distribution-based clustering algorithm, a density-based clustering algorithm, or the like. Dimensionality reduction may involve applying a dimensionality reduction algorithm to the SAR data to transform it from a high-dimensional space with many features to a low-dimensional space with fewer features, which may make the SAR data easier to process. The dimensionality reduction algorithm may be an encoder, t-distribution stochastic neighbor embedding (t-SNE), uniform manifold approximation and projection (UMAP), or the like.

In some circumstances, the preprocessing module 120 may also perform three-dimensional (3D) modeling and simulation on the SAR data to allow for the viewing of the SAR data from various angles to gain understandability about a scene.

The GAN 130 can receive the normalized SAR data from the preprocessing module 120 and process it to generate an RGB image. The GAN 130 may have a generative network 132 and a discriminative network 134, as shown in FIG. 1. The generative network 132 can generate the RGB image. The generative network 132 may be a neural network. The neural network may be a feed-forward neural network, a convolutional neural network (CNN), or the like. In some embodiments, the generative network 132 is an autoencoder. The autoencoder may have an encoder that is configured to generate a latent space representation of the normalized SAR data. The autoencoder may also have a decoder that is configured to generate an RGB image from the latent space representation. The autoencoder may include feedforward, convolutional, or recurrent layers. In some embodiments, the autoencoder may be a fully convolutional autoencoder.

The discriminative network 134 can train the generative network 132. The training process will be described in detail in reference to FIG. 2. The discriminative network 134 may be a classifier. The discriminative network 134 may be a neural network.

Figure 5:
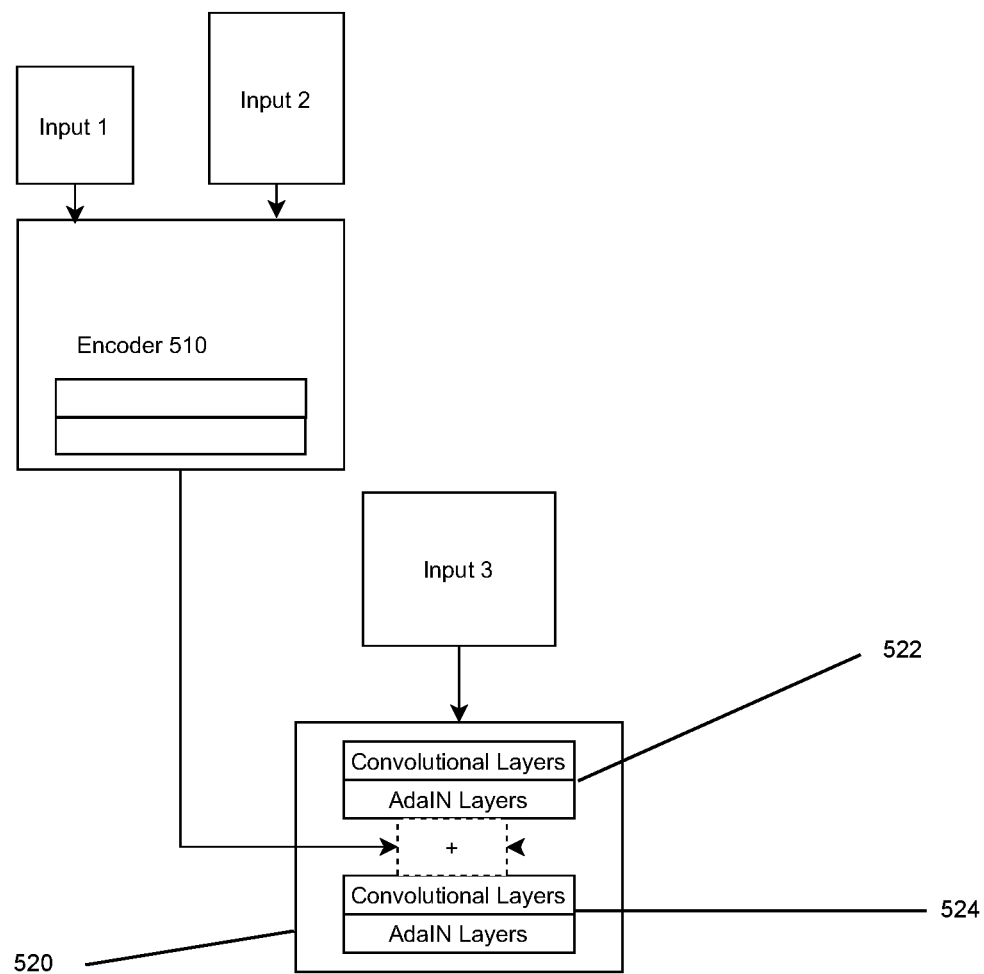
FIG. 5 schematically illustrates a generative network of the system of FIG. 1, according to some embodiments of the present disclosure.

FIG. 5 schematically illustrates an alternative embodiment of a generative network that may be used in the GAN 130 of FIG. 1. The generative network of FIG. 5 may have an encoder 510 and a network 520. The encoder 510 may receive a representation of the desired output domain of the network 520 (Input 1) and a sampled vector from a truncated Gaussian distribution (Input 2). The truncated Gaussian distribution may be a distribution of textures and patterns in the SAR data discovered during pre-processing. Inputs 1 and 2 may provide context about what the output of the network 520 should look like. In some embodiments, the encoder 510 may be a neural network with one or more fully connected layers. In other embodiments, the encoder 510 may be a neural network with one or more convolutional layers and one or more adaptive instance normalization (AdaIN) layers.

The network 520 may have a first sub-network 522 and a second sub-network 524. The first sub-network 522 may be an encoder. In some embodiments, the first sub-network 522 may have one or more convolutional layers and one or more AdaIN layers. The first sub-network 522 may receive SAR data (Input 3) and generate a latent space representation of the SAR data. The latent space representation may then be appended to the output of the encoder 510. The second sub-network 524 can process the latent space representation and the output of the encoder 522 to generate an RGB image. The second sub-network 524 may be a decoder. The second sub-network 524 may have one or more convolutional layers and one or more AdaIN layers. In alternative embodiments, the network 520 instead receives RGB data and generates SAR data.

The postprocessing module 140 can receive the RGB image from the generative network 134 and undo the effect of the preprocessing module 110, e.g., by multiplying the RGB image by the standard deviation of the SAR data and adding the result to the mean of the SAR data. The postprocessing module 140 can also undo any preprocessing performed by the preprocessing module 120 (e.g., clustering or dimensionality reduction). The resulting RGB image may be transmitted to an analyst in real-time or substantially real-time for review. Alternatively or additionally, the resulting RGB image may be provided to an image processing pipeline that is configured to classify objects in the RGB image.

The system of FIG. 1 and its components can be implemented on one or more computing devices. The computing devices can be servers, desktop or laptop computers, electronic tablets, mobile devices, or the like. The computing devices can be located in one or more locations. The computing devices can have general-purpose processors, graphics processing units (GPU), application-specific integrated circuits (ASIC), field-programmable gate-arrays (FPGA), or the like. The computing devices can additionally have memory, e.g., dynamic or static random-access memory, read-only memory, flash memory, hard drives, or the like. The memory can be configured to store instructions that, upon execution, cause the computing devices to implement the functionality of the components. The computing devices can additionally have network communication devices. The network communication devices can enable the computing devices to communicate with each other and with any number of user devices, over a network. The network can be a wired or wireless network. For example, the network can be a fiber optic network, Ethernet® network, a satellite network, a cellular network, a Wi-Fi® network, a Bluetooth® network, or the like. In other implementations, the computing devices can be several distributed computing devices that are accessible through the Internet. Such computing devices may be considered cloud computing devices.

Figure 2:
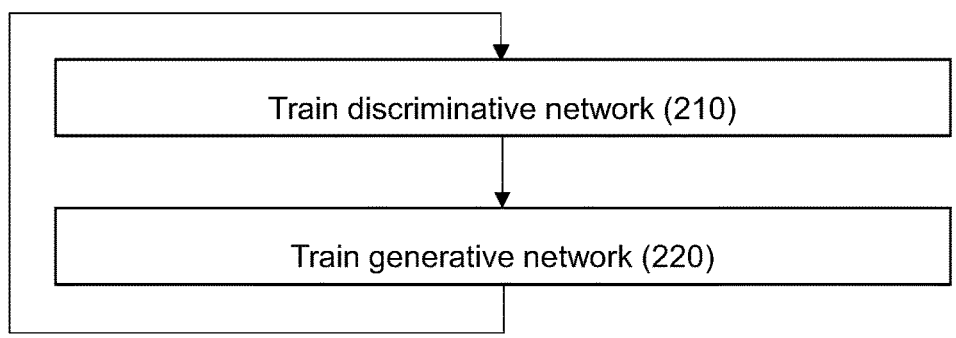
FIG. 2 is a flow chart of a process for training a generative adversarial network, according to some embodiments of the present disclosure.

FIG. 2 is a flow chart of a process 200 for training the GAN 130 of FIG. 1. The process can be performed by a system of one or more appropriately programmed computers in one or more locations.

In an operation 210, the system can train the discriminative network 134 to classify inputs as being true RGB images (e.g., aerial images of the Earth taken by a digital photograph) or RGB images generated by the generative network 132. The training data may include both true RGB images and RGB images generated by the generative network 132. The true RGB images and generated RGB images may be labeled as such, enabling the system to train the discriminative network 134 through a supervised learning process. The loss function of the discriminative network 134 may be the error of the network in classifying the training inputs. The supervised learning process may involve computing the gradient of the loss function with respect to the weights of the network and updating those weights accordingly. During operation 210, the generative network 132 is not trained.

In an operation 220, the system can train the generative network 132 to generate RGB images from SAR data. Training the generative network 132 may involve providing SAR data to the generative network 132 to produce an output, providing that output to the discriminative network 134 to classify it as a true RGB image or a generated RGB image and computing the loss of the generative network 132. The loss function of the generative network 132 may penalize the generative network 132 for failing to fool the discriminative network 134. The system can compute the gradient of the loss function with respect to the weights of the generative network 132 via backpropagation through both networks. However, during operation 220, only the weights of the generative network 132 are actually updated. The loss function may be a mean-square error function or the like. The loss function may have a regularization (e.g., L1 or L2 normalization) term.

In some embodiments, training the GAN 130 may involve a supervised learning process in which SAR data is provided to the generative network 132 to generate a predicted RGB image and the predicted RGB image is compared to an actual RGB image of the same location as the SAR data. The error between the two can be incorporated into the loss function. The error may be computed using a perceptual loss function, mutual information loss function, a cross-correlation loss function, an L1 loss function, an L2 loss function or the like. In some cases, however, coincident SAR data and RGB images may not be available. In such cases, self-consistency loss, such as cycle loss, may be incorporated into the loss function of the generative network 132. Self-consistency loss may be calculated by providing SAR data to the generative network 132 to generate a predicted RGB image and providing the predicted RGB image to a second generative network that is trained in tandem with the generative network 132. The second generative network may be configured to generate predicted SAR data from the predicted RGB image. The self-consistency loss of the generative network 132 may be the difference between the original SAR data and the predicted SAR data. The self-consistency loss may be incorporated into the loss function of the generative network 132. In some embodiments, the generative network 132 may instead be trained to do predict SAR data from an RGB image and a second generative network is not needed. The system can repeat operations 210 and 220 several times, until convergence of the generative network 132.

In some cases, the true RGB images and SAR data used in the training process described above may be tagged with metadata that indicates, for example, the location at which the images were captured, or the SAR data was obtained. Such metadata may improve the performance of the generative network 132 in generating realistic RGB images. For example, a generated RGB image for a given location may be more appropriately colored based on the landscape typically found in that location.

Figure 3:
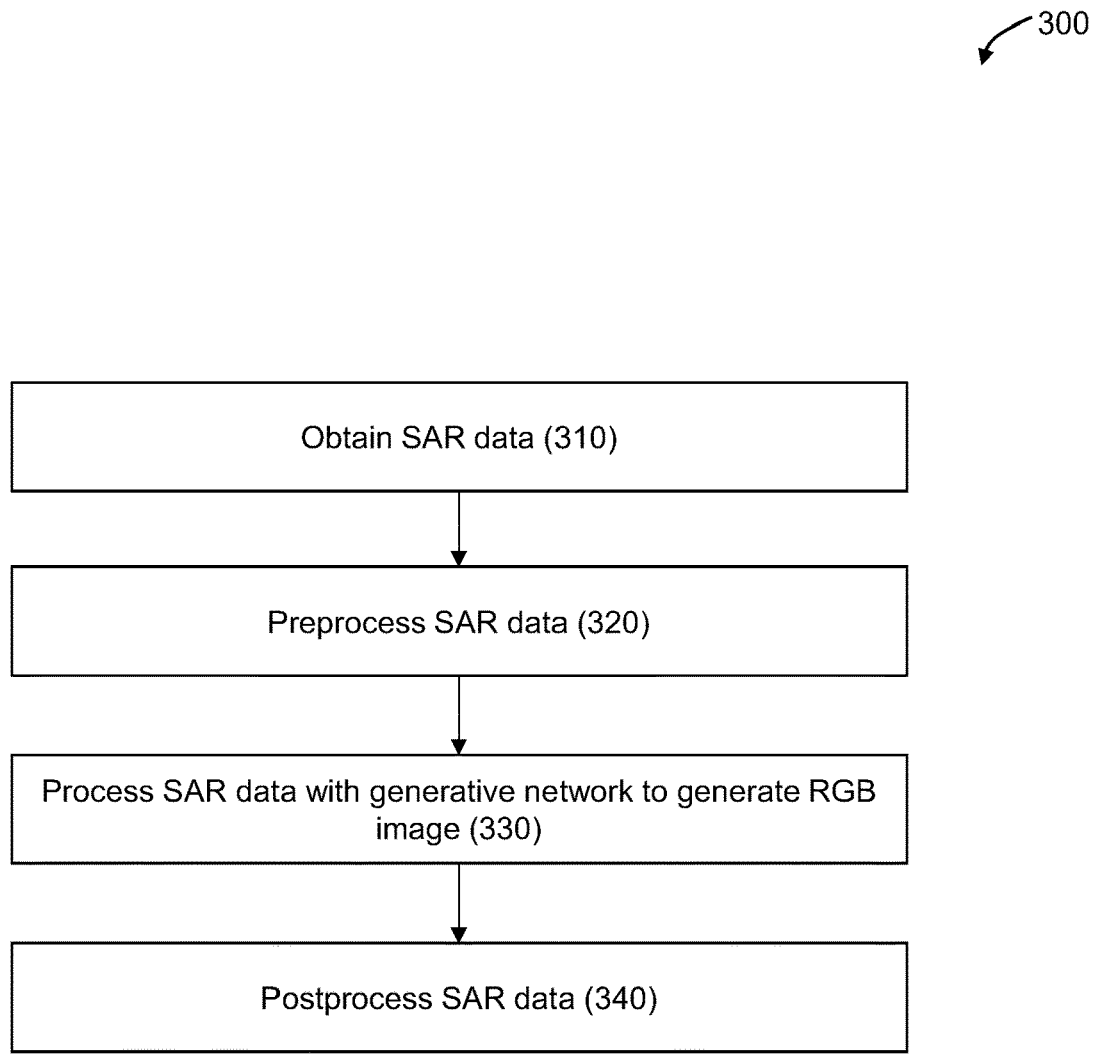
FIG. 3 is a flow chart of a process for generating RGB images from SAR data, according to some embodiments of the present disclosure.

FIG. 3 is a flow chart of a process 300 for generating an RGB image from SAR data. The process can be performed by the system 100 of FIG. 1. In an operation 310, the system can obtain SAR data. In an operation 320, the system can preprocess the SAR data. In one embodiment, preprocessing involves normalization. Normalization may involve subtracting a mean of the SAR data and dividing by a standard deviation of the SAR data. In an operation 330, the system can process the preprocessed SAR data with a generative network (e.g., the generative network 132) to generate an RGB image. In an operation 340, the system can postprocess the RGB image, e.g., by multiplying by the standard deviation of the SAR data and adding the mean of the SAR data to undo the preprocessing.

Neural Networks

The present disclosure describes various types of neural networks. Neural networks employ multiple layers of operations to predict one or more outputs from one or more inputs. Neural networks may have one or more hidden layers situated between an input layer and an output layer. The output of each layer may be the input to another layer, e.g., the next hidden layer or the output layer. Each layer of a neural network may specify one or more transformation operations to be performed on the input to the layer. Such transformation operations may be referred to as neurons. The output of a particular neuron may be a weighted sum of the inputs to the neuron, adjusted with a bias and multiplied by an activation function, e.g., a rectified linear unit (ReLU) or a sigmoid function.

Training a neural network may involve providing inputs to the untrained or partially neural network to generate predicted outputs, comparing the predicted outputs to expected outputs, and updating the algorithm's weights and biases to account for the difference between the predicted outputs and the expected outputs. Specifically, a cost function may be used to calculate a difference between the predicted outputs and the expected outputs. By computing the derivative of the cost function with respect to the weights and biases of the network, the weights and biases may be iteratively adjusted over multiple cycles to minimize the cost function. Training may be complete when the predicted outputs satisfy a convergence condition, e.g., a small magnitude of calculated cost as determined by the cost function.

CNNs are neural networks in which neurons in some layers, called convolutional layers, receive input from only a small portion of the input data set (e.g., a short time segment of a speech data). These small portions may be referred to as the neurons' receptive fields. Each neuron in such a convolutional layer can have the same weights. In this way, the convolutional layer can detect certain features in any portion of the input data set. CNNs may also have pooling layers that combine the outputs of neuron clusters in convolutional layers and fully connected layers that are similar to traditional layers in a feed-forward neural network.

Computer Systems

Figure 4:
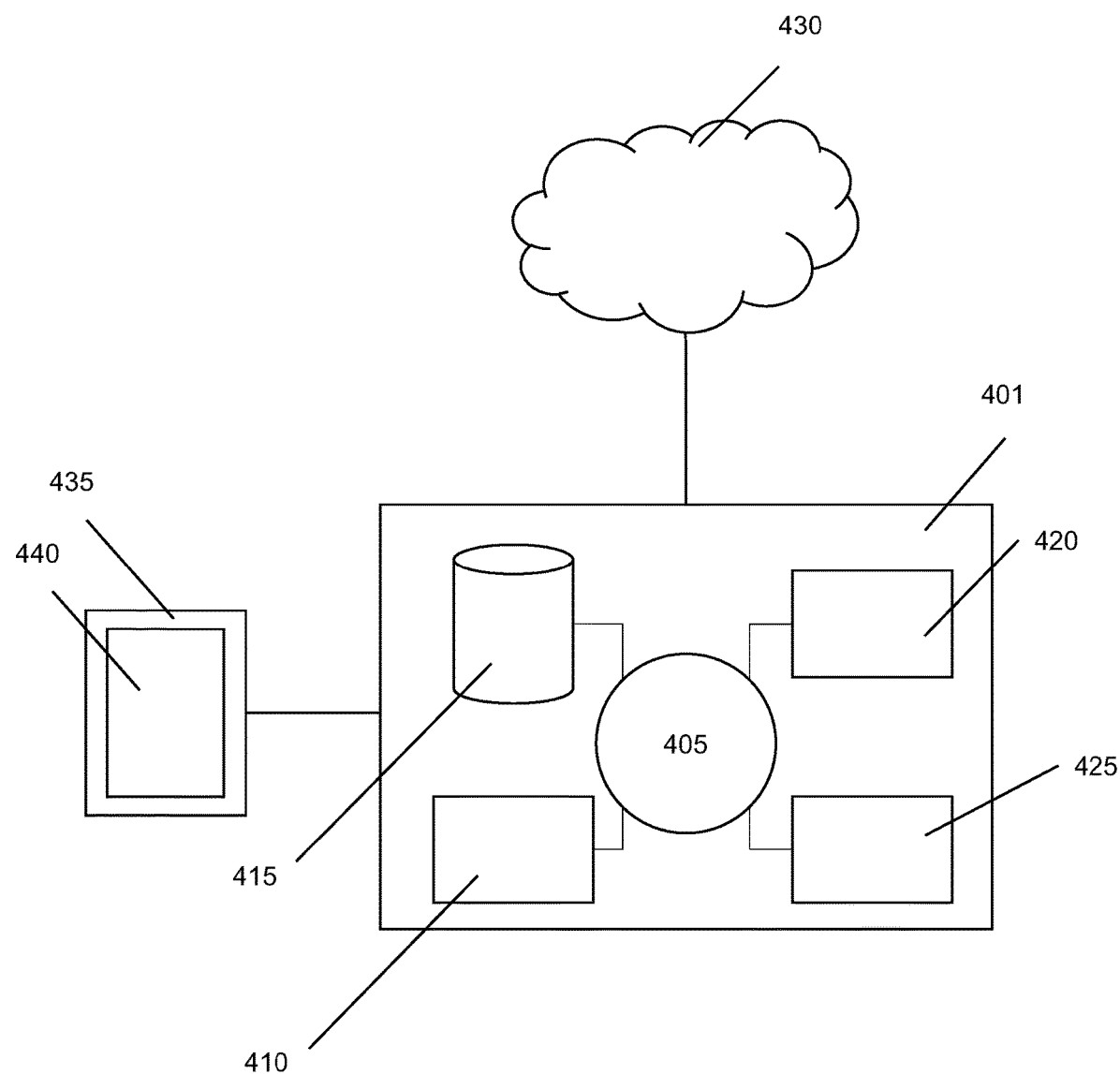
FIG. 4 shows a computer system that is programmed or otherwise configured to implement methods provided herein.

The present disclosure provides computer systems that are programmed to implement methods of the disclosure. FIG. 4 shows a computer system 401 that is programmed or otherwise configured to implement the system 100 or perform processes 200 or 300.

The computer system 401 includes a central processing unit (CPU, also "processor" and "computer processor" herein) 405, which can be a single core or multi core processor, or a plurality of processors for parallel processing. The computer system 401 also includes memory or memory location 410 (e.g., random-access memory, read-only memory, flash memory), electronic storage unit 415 (e.g., hard disk), communication interface 420 (e.g., network adapter) for communicating with one or more other systems, and peripheral devices 425, such as cache, other memory, data storage and/or electronic display adapters. The memory 410, storage unit 415, interface 420 and peripheral devices 425 are in communication with the CPU 405 through a communication bus (solid lines), such as a motherboard. The storage unit 415 can be a data storage unit (or data repository) for storing data. The computer system 401 can be operatively coupled to a computer network ("network") 430 with the aid of the communication interface 420. The network 430 can be the Internet, an internet and/or extranet, or an intranet and/or extranet that is in communication with the Internet. The network 430 in some cases is a telecommunication and/or data network. The network 430 can include one or more computer servers, which can enable distributed computing, such as cloud computing. The network 430, in some cases with the aid of the computer system 401, can implement a peer-to-peer network, which may enable devices coupled to the computer system 401 to behave as a client or a server.

The CPU 405 can execute a sequence of machine-readable instructions, which can be embodied in a program or software. The instructions may be stored in a memory location, such as the memory 410. The instructions can be directed to the CPU 405, which can subsequently program or otherwise configure the CPU 405 to implement methods of the present disclosure. Examples of operations performed by the CPU 405 can include fetch, decode, execute, and writeback.

The CPU 405 can be part of a circuit, such as an integrated circuit. One or more other components of the system 401 can be included in the circuit. In some cases, the circuit is an application specific integrated circuit (ASIC).

The storage unit 415 can store files, such as drivers, libraries and saved programs. The storage unit 415 can store user data, e.g., user preferences and user programs. The computer system 401 in some cases can include one or more additional data storage units that are external to the computer system 401, such as located on a remote server that is in communication with the computer system 401 through an intranet or the Internet.

The computer system 401 can communicate with one or more remote computer systems through the network 430. For instance, the computer system 401 can communicate with a remote computer system of a user (e.g., a computer system with a user interface for reviewing RGB images). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 401 via the network 430.

Methods as described herein can be implemented by way of machine (e.g., computer processor) executable code stored on an electronic storage location of the computer system 401, such as, for example, on the memory 410 or electronic storage unit 415. The machine executable or machine-readable code can be provided in the form of software. During use, the code can be executed by the processor 405. In some cases, the code can be retrieved from the storage unit 415 and stored on the memory 410 for ready access by the processor 405. In some situations, the electronic storage unit 415 can be precluded, and machine-executable instructions are stored on memory 410.

The code can be pre-compiled and configured for use with a machine having a processor adapted to execute the code or can be compiled during runtime. The code can be supplied in a programming language that can be selected to enable the code to execute in a pre-compiled or as-compiled fashion.

Aspects of the systems and methods provided herein, such as the computer system 401, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 401 can include or be in communication with an electronic display 435 that comprises a user interface (UI) 440. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 405. The algorithm can, for example, an algorithm for training the GAN 130.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for generating a red-green-blue (RGB) image from synthetic aperture radar (SAR) data, comprising:
    (a) obtaining said SAR data;
    (b) pre-processing said SAR data to generate pre-processed SAR data; and
    (c) using a trained generative neural network to directly convert said pre-processed SAR data into said RGB image, wherein said RGB image is generated using only said pre-processed SAR data.

2. The method of claim 1, wherein (b) comprises applying a clustering algorithm to said SAR data.

3. The method of claim 1, wherein (b) comprises applying a dimensionality reduction algorithm to said SAR data.

4. The method of claim 1, wherein (b) comprises normalizing said SAR data.

5. The method of claim 1, wherein said generative neural network comprises an encoder and a decoder.

6. The method of claim 5, wherein said encoder comprises one or more fully connected layers.

7. The method of claim 5, wherein said encoder comprises one or more convolutional layers and one or more adaptive instance normalization (AdaIN) layers.

8. The method of claim 5, wherein said decoder comprises one or more convolutional layers and one or more adaptive instance normalization (AdaIN) layers.

9. The method of claim 1, further comprising, prior to (c), training said generative neural network with a discriminative neural network.

10. The method of claim 9, wherein said training comprises: (1) training said discriminative neural network to classify an input image as a true RGB image or a predicted RGB image generated by said generative neural network; and (2) training said generative neural network to generate predicted RGB images that said discriminative neural network incorrectly classifies as true RGB images.

11. The method of claim 10, wherein (2) comprises providing a plurality of SAR training examples to said generative neural network to generate a plurality of predicted RGB images, providing said plurality of predicted RGB images to said discriminative neural network, and penalizing said generative neural network if said discriminative neural network correctly classifies said predicted RGB images.

12. The method of claim 9, further comprising training said generative neural network at least in part on coincident pairs of SAR data and RGB images.

13. The method of claim 9, further comprising training said generative neural network using self-consistency loss.

14. The method of claim 1, further comprising, subsequent to (c), postprocessing said RGB image to undo said pre-processing in (b).

15. The method of claim 1, further comprising displaying said RGB image in a user interface, wherein (a)-(c) are performed in less than 5 seconds.

16. The method of claim 14, further comprising providing said RGB image to an image processing pipeline for analysis.

17. The method of claim 1, wherein said SAR data comprises a location at which said SAR data was obtained.

18. The method of claim 1, wherein said generative neural network receives as an input a representation of a desired output domain and a sampled vector from a truncated Gaussian distribution.

19. One or more non-transitory computer storage media storing instructions that are operable, when executed by one or more computers, to cause said one or more computers to perform operations comprising:
obtaining synthetic aperture radar (SAR) data;
pre-processing said SAR data to generate pre-processed SAR data; and
using a trained generative neural network to directly convert said pre-processed SAR data into said RGB image, wherein said RGB image is generated using only said pre-processed SAR data.

20. A system, comprising:
one or more computer processors; and
memory comprising machine-executable instructions that, upon execution by said one or more computer processors, are configured to generate a red-green-blue (RGB) image from synthetic aperture radar (SAR) data by:
obtaining said SAR data;
pre-processing said SAR data to generate pre-processed SAR data; and
using a trained generative neural network to directly convert said pre-processed SAR data into said RGB image, wherein said RGB image is generated using only said pre-processed SAR data.

* * * * *